(12) United States Patent
Son et al.

(10) Patent No.: US 7,059,197 B2
(45) Date of Patent: Jun. 13, 2006

(54) GROUND REACTION FORCE MEASURING MODULE FOR WALKING ROBOT AND ROBOT FOOT STRUCTURE ADOPTING THE SAME

(75) Inventors: Young Son, Yongin (KR); Yeon-taek Oh, Yongin (KR); Kyoung-sig Roh, Seongnam (KR); Joo-young Kwak, Seongnam (KR); Yong-kwun Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 89 days.

(21) Appl. No.: 10/435,377

(22) Filed: May 12, 2003

(65) Prior Publication Data

US 2004/0169504 A1    Sep. 2, 2004

(30) Foreign Application Priority Data

Feb. 27, 2003    (KR) .................... 10-2003-0012359

(51) Int. Cl.
*G01N 3/08* (2006.01)
(52) U.S. Cl. ........................................ 73/818
(58) Field of Classification Search .............. 73/818, 73/7, 862, 541; 702/150; 324/207.17; 318/568.12; 403/62; 180/8.1, 8.6; 623/24; 701/23; 700/245, 260
See application file for complete search history.

(56) References Cited

U.S. PATENT DOCUMENTS

| | | | |
|---|---|---|---|
| 4,695,963 A | | 9/1987 | Sagisawa et al. |
| 5,151,859 A | * | 9/1992 | Yoshino et al. ............. 701/23 |
| 5,255,753 A | | 10/1993 | Nishikawa et al. |
| 5,421,426 A | | 6/1995 | De Beaucourt et al. |
| 5,432,417 A | * | 7/1995 | Takenaka et al. ...... 318/568.12 |
| 5,455,497 A | * | 10/1995 | Hirose et al. .......... 318/568.12 |
| 5,513,106 A | * | 4/1996 | Yoshino et al. ............. 701/23 |
| 5,807,011 A | * | 9/1998 | Hong et al. .................... 403/62 |
| 5,974,366 A | * | 10/1999 | Kawai et al. ................ 702/150 |
| 6,247,546 B1 | * | 6/2001 | Spletzer et al. ............. 180/8.5 |
| 6,377,014 B1 | * | 4/2002 | Gomi et al. ........... 318/568.12 |
| 6,505,096 B1 | * | 1/2003 | Takenaka et al. ........... 700/245 |
| 6,538,410 B1 | * | 3/2003 | Mori et al. ............ 318/568.12 |
| 6,581,437 B1 | * | 6/2003 | Chrystall et al. ................. 73/7 |

(Continued)

FOREIGN PATENT DOCUMENTS

EP    0 406 018 A1    1/1991

(Continued)

OTHER PUBLICATIONS

Notice to submit response issued by the Korean Patent Office on Feb. 25, 2005 in a corresponding application.

*Primary Examiner*—Max Noori
*Assistant Examiner*—Octavia Davis
(74) *Attorney, Agent, or Firm*—Buchanan Ingersoll PC (57) ABSTRACT

A ground reaction force measuring module for a walking robot includes a housing installed at a predetermined portion of the walking robot facing the ground, a moving unit installed capable of moving with respect to the housing according to the presence of a pressing force to the ground transferred from the ground to the walking robot, and a compression sensor installed in the housing to measure a reaction force of the ground from the presence of the pressing force transferred through the moving unit. Thus, a change in the ground reaction force in a wide range can be stably coped with and the installation position of the robot foot can be easily changed.

9 Claims, 7 Drawing Sheets

U.S. PATENT DOCUMENTS 6,770,045 B1 * 8/2004 Naft et al. ..................... 602/16

FOREIGN PATENT DOCUMENTS

| JP | 4152075 | 5/1992 |
| JP | 2000-254888 | 3/1999 |
| JP | 2000254888 | 9/2000 |
| JP | 2002337076 | 11/2002 |

* cited by examiner

GROUND REACTION FORCE MEASURING MODULE FOR WALKING ROBOT AND ROBOT FOOT STRUCTURE ADOPTING THE SAME

BACKGROUND OF THE INVENTION

This application claims the priority of Korean Patent Application No. 2003-12359 filed on Feb. 27, 2003 in the Korean Intellectual Property Office, the disclosure of which is incorporated herein in its entirety by reference.

1. Field of the Invention

The present invention relates to a ground reaction force measuring module for a walking robot and a robot foot structure adopting the same, and more particularly, to a ground reaction force measuring module for a walking robot which can measure a ground reaction force using a film type compression sensor, and a robot foot structure adopting the same.

2. Description of the Related Art

In a typical walking robot, it is important to keep balance of a robot for a stable walking. Thus, to obtain information necessary for the balance of a robot during walking, a ground reaction force transferred from the ground to a robot foot needs to be measured.

In a conventional walking robot, a ground reaction force measuring system using a load cell to measure a ground reaction force transferred from the ground is disclosed in Japanese Patent Publication No. 2000-254888.

In the ground reaction force measuring system using a load cell, the installation position of a load cell should be considered when a walking robot is designed, due to its characteristic measurement method. Thus, when the load cell is to be installed on a finished robot, since the structure of the robot needs to be changed, the installation of the load cell is actually difficult. Also, since an additional system to operate the load cell is needed, the overall volume of a module increases. Furthermore, the measurement system using the load cell is expensive.

SUMMARY OF THE INVENTION

To solve the above and/or other problems, the present invention provides a ground reaction force measuring module for a walking robot using a film type compression sensor which can be easily installed on the robot without a change in the structure of a finished robot, is modularized into a simple structure to be easily maintained and repaired, and can respond to an impact transferred from the ground, and a robot foot structure adopting the same.

According to an aspect of the present invention, a ground reaction force measuring module for a walking robot comprises a housing installed at a predetermined portion of the walking robot facing the ground, a moving unit installed capable of moving with respect to the housing according to the presence of a pressing force to the ground transferred from the ground to the walking robot, and a compression sensor installed in the housing to measure a reaction force of the ground from the presence of the pressing force transferred through the moving unit.

The housing comprises a compression sensor holder including an accommodation portion in which the compression sensor is accommodated and a through hole connecting the accommodation portion and the outside, and a cover member coupled to the housing above the accommodation portion.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
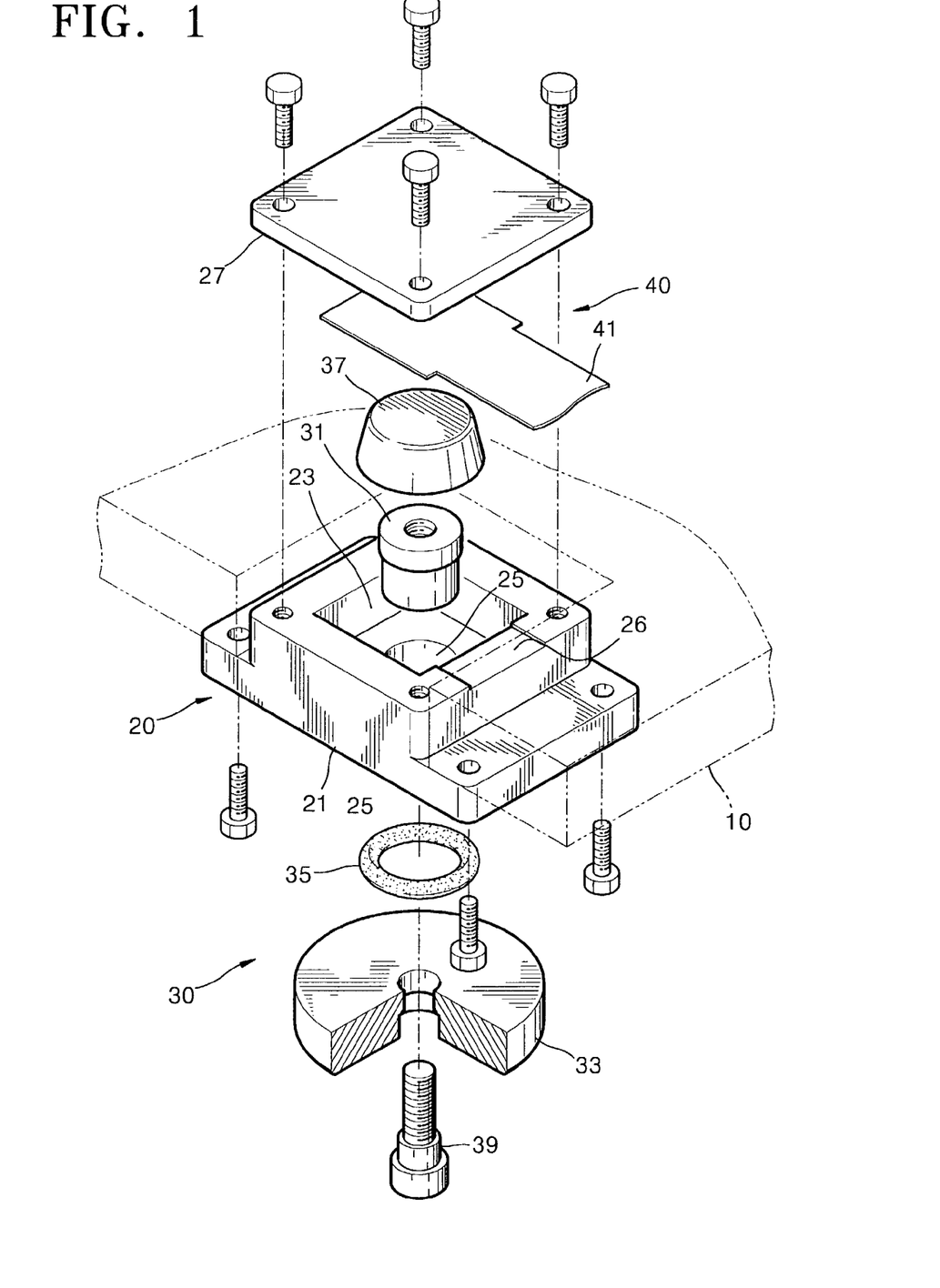
FIG. 1 is an exploded perspective view illustrating a ground reaction force measuring module for a walking robot according to a preferred embodiment of the present invention.
Figure 2:
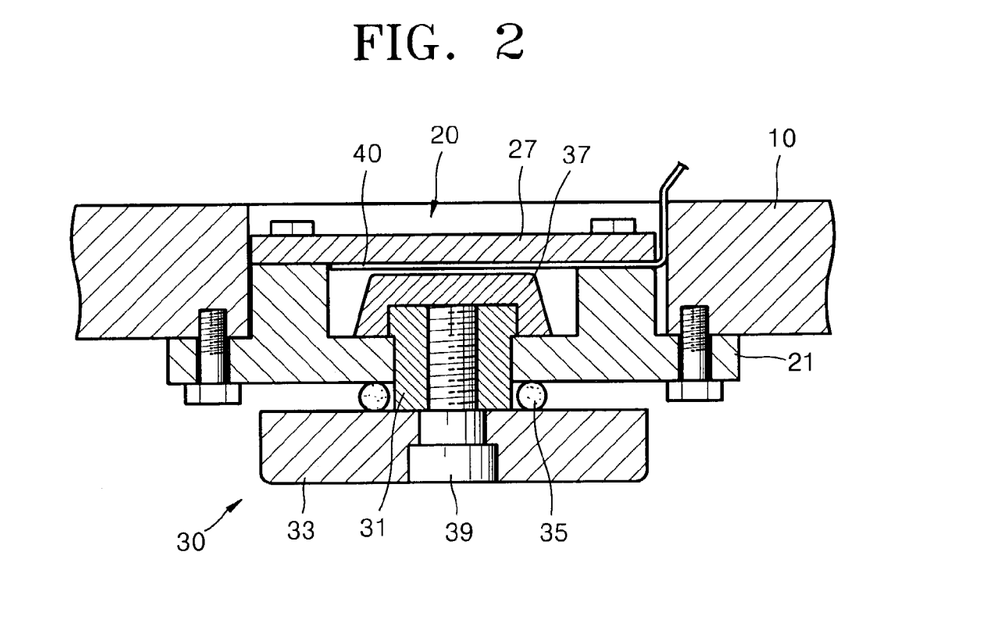
FIG. 2 is a sectional view illustrating the ground reaction force measuring module of FIG. 1.

Referring to FIGS. 1 and 2 a ground reaction force measuring module for a walking robot according to a preferred embodiment of the present invention includes a housing 20 installed on a predetermined portion of the walking robot facing the ground, that is, a robot foot 10, a moving unit 30 installed capable of moving with respect to the housing 20 according to whether or not the robot foot 10 receives pressure from the ground, and a compression sensor 40 installed in the housing 20 to measure a reaction force of the ground from the presence of the pressure transferred through the moving unit 30.

The housing 20 includes a compression sensor holder 21 coupled to the robot foot 10 and a cover member 27 coupled to the compression sensor holder 21. The compression sensor holder 21 includes an accommodation portion 23 accommodating the compression sensor 40 and a through hole 25 connecting the accommodation portion 23 and the outside. A space 26 through which a cable 41 electrically connected to the compression sensor 40 passes is formed at a portion of the compression sensor holder 21 facing the cover member 27. The cover member 27 protects the compression sensor 40 and is coupled above the accommodation portion 23. Also, the cover member 27 supports the rear surface of the compression sensor 40 so that the compression sensor 40 receives a predetermined pressure when pressure is applied from the ground.

Since the ground reaction force measuring module is incorporated by providing the housing 20, the ground reaction force measuring module according to the present invention can be freely installed at a desired position of the robot foot 10.

The moving unit 30 includes a moving member 31 movably installed in the through hole 25, a support member 33 coupled to the moving member 31 and supporting the walking robot by directly contacting the ground, and an elastic member 35 interposed between the housing 20 and the support member 33.

Preferably, the moving unit 30 further includes a cap member 37 selectively contacting the compression sensor 40 according to the movement of the moving member 31. The cap member 37 is inserted around one end of the moving member 31 disposed in the accommodation portion 23. The cap member 37 is made of rubber to have a predetermined elasticity. Accordingly, when pressure is applied to the compression sensor 40, the cap member 37 can prevent damage to a measurement portion of the compression sensor 40 and simultaneously absorb an impact transferred from the ground.

The support member 33 directly contacting the ground is coupled to the other end of the moving member 31. The support member 33, as shown in FIGS. 1 and 2, is a structure having a disk shape, or a structure having a plate shape which can be simultaneously coupled to a plurality of the moving members of the ground reaction force measuring module as described later.

The support member 33 is detachably coupled to the moving member 31 by changing its shape, if necessary. For this purpose, the support member 33 is preferably coupled to the moving member 31 using a screw 39. A hook coupling structure (not shown) is available in addition to the coupling method using the screw 39.

The elastic member 35 is disposed between the compression sensor holder 21 and the support member 33 and is any of an O-ring, a coil spring, and a wave spring which is made of an elastic material. The elastic member 35 prevents the cap member 37 from contacting the compression sensor 40 when a pressing force acting on the support member 33 is removed.

Figure 3:
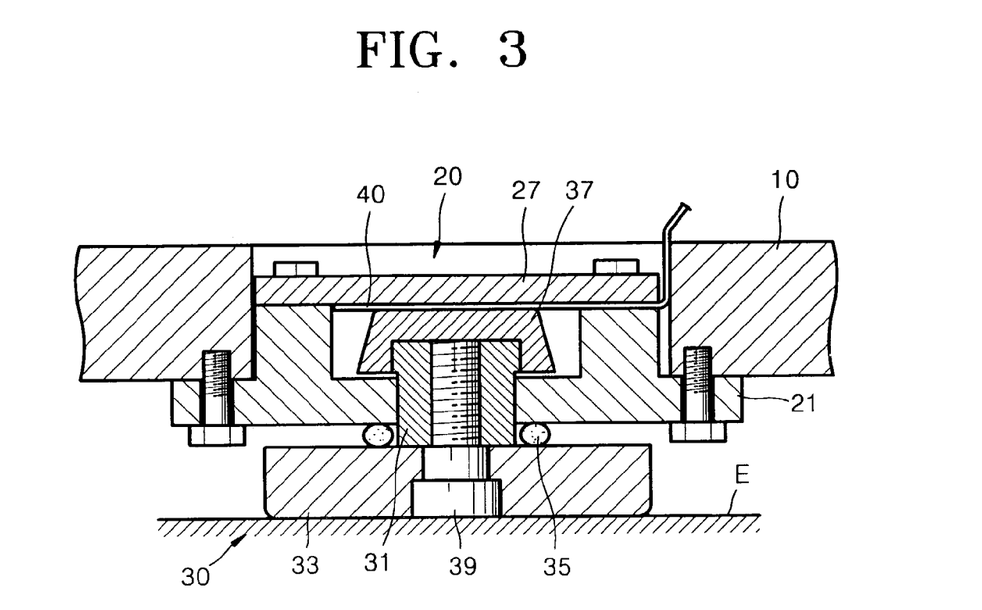
FIG. 3 is a sectional view illustrating the operation of the ground reaction force measuring module of FIG. 1.

As shown in FIG. 3, when the pressing force is transferred to the support member 33 from the ground E, the support member 33 is moved toward the compression sensor 40 by overcoming a restoration force of the elastic member 35. Accordingly, the cap member 37 contacts the compression sensor 40.

Figure 4A:
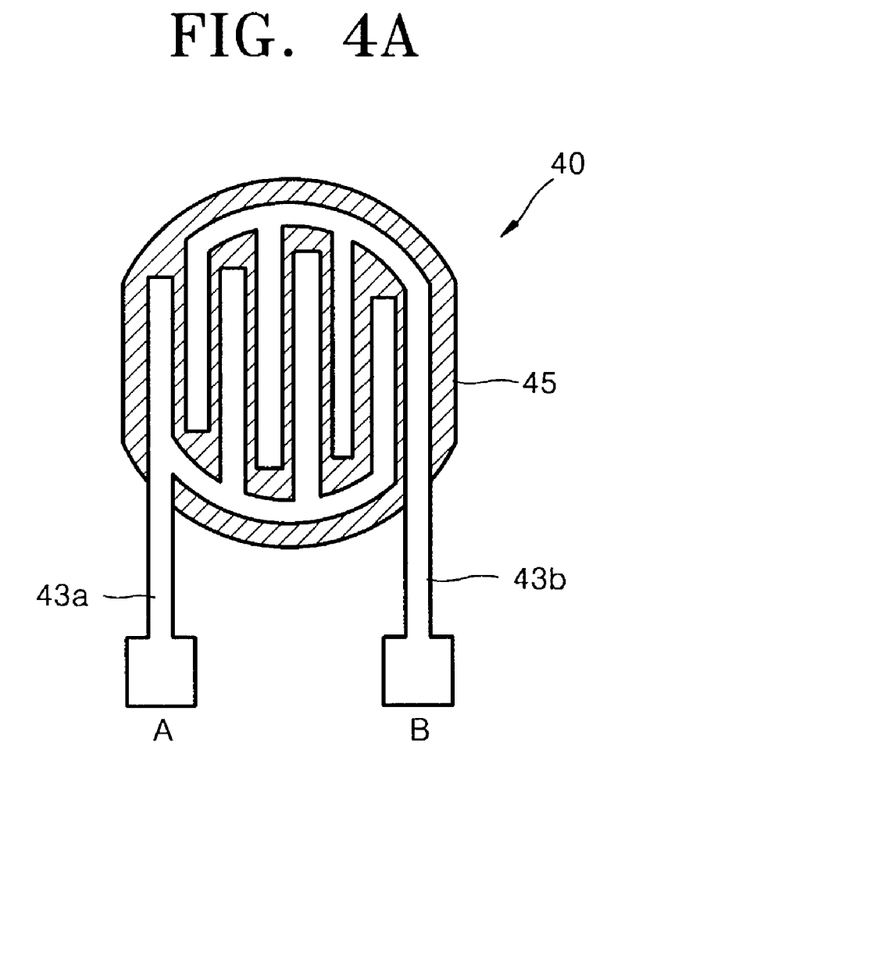
FIG. 4A is a view illustrating a compression sensor of FIG. 1.
Figure 4B:
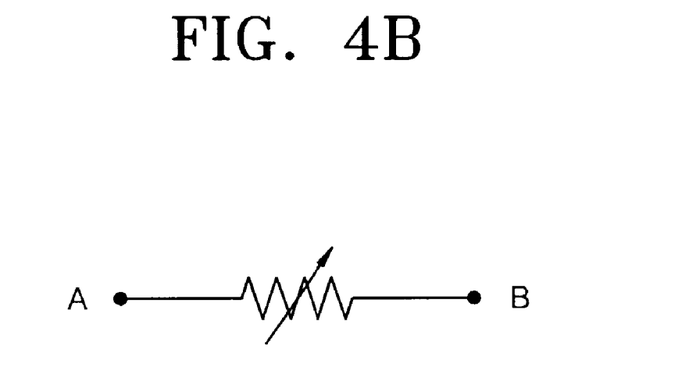
FIG. 4B is a view illustrating an equivalent circuit of FIG. 4A.

The compression sensor 40 is preferably a load measurement sensor in a thin film form so that the amount of a change in pressure transferred by the moving unit 30 can be measured. FIGS. 4A and 4B show a force sensing resistor (FSR) device which is one of the film type load or pressure measurement sensors.

The FSR device is electrically connected to the outside through two electrodes A and B. The FSR device includes first and second conductive paths 43a and 43b made of a conductive body and separated a predetermined distance from each other, and a resistance film 45 arranged on a lower portion of the first and second conductive paths 43a and 43b to prevent flow of current between the first and second conductive paths 43a and 43b. Thus, the FSR device detects whether or not an external pressure is applied and, when pressure is applied, resultant voltage values of the electrodes A and B change according to the amount of a change in the pressure. The measured ground reaction force passes amplification and A/D converting circuits so as to be used for generation of a walking pattern and a desired walking algorithm of a walking robot.

The compression sensor 40 can include at least two film type load or pressure measurement sensors, unlike the above-described preferred embodiment in which one load measurement sensor is adopted.

Figure 5:
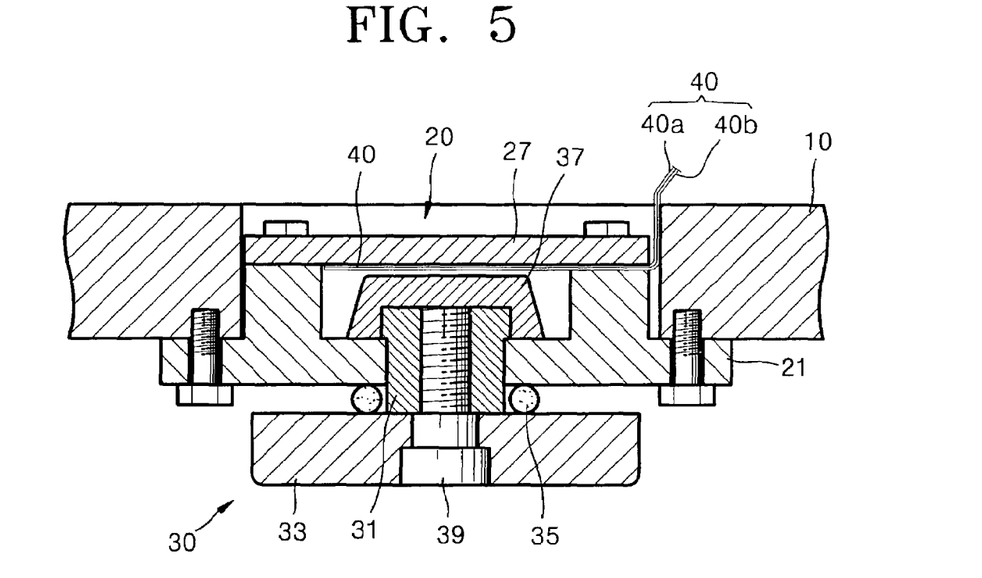
FIG. 5 is a sectional view illustrating a ground reaction force measuring module for a walking robot according to another preferred embodiment of the present invention.

FIG. 5 shows a case in which first and second film type load or pressure measurement sensors 40a and 40b are disposed on each other. The first and second film type load or pressure measurement sensors 40a and 40b can be sensors measuring the same load. In this case, a ground reaction force can be measured from an average value of loads measured through the first and second film type load or pressure measurement sensors 40a and 40b. Thus, since the ground reaction force is measured by using the average value, an error with respect to the amount of a change in the pressure measured through the compression sensor 40 can be reduced so that a correct ground reaction force value can be stably obtained.

Also, the first and second film type load or pressure measurement sensors 40a and 40b can be sensors measuring different loads. In this case, the first and second film type load or pressure measurement sensors 40a and 40b are selectively used according to a range of the ground reaction force value, and appropriately respond to a variety of changes in the ground reaction force.

Figure 6:
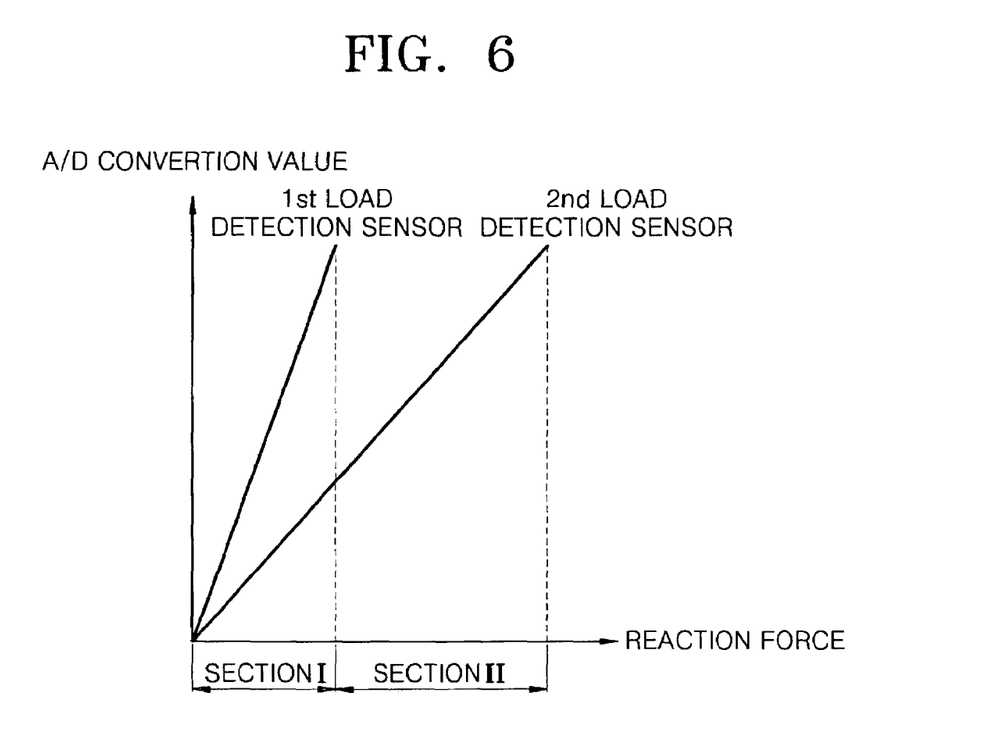
FIG. 6 is a graph showing an A/D conversion value according to a change in the ground reaction force measured by the compression sensor of FIG. 5.

FIG. 6 is a graph showing an A/D (analog-to-digital) conversion value according to a reaction force measured by using the first and second film type load or pressure measurement sensors 40a and 40b guaranteeing linearity with respect to different loads. Here, the A/D conversion value is obtained by converting a voltage signal measured by the first and second film type load or pressure measurement sensors 40a and 40b to a digital value and varies according to the strength of the reaction force. Referring to FIG. 6, when the measured reaction force corresponds to Section I, data is taken from the first load measurement sensor 40a guaranteeing linearity with respect to a lighter load. When the measured reaction force corresponds to Section II, data is taken from the second load measurement sensor 40b guaranteeing linearity with respect to a relatively heavier load.

Accordingly, by selectively using the first and second film type load or pressure measurement sensors 40a and 40b according to the amount of a reaction force, linearity can be sufficiently obtained with respect to a variously changing ground reaction force value and a stable ground reaction force value can be obtained.

Although the first and second film type load or pressure measurement sensors are described as a compression sensor in FIGS. 5 and 6, the compression sensor is not limited to two sensors and can include two or more sensors. In this case, a sensor measuring the same load and a sensor measuring different loads can be used by being combined.

Figure 7:
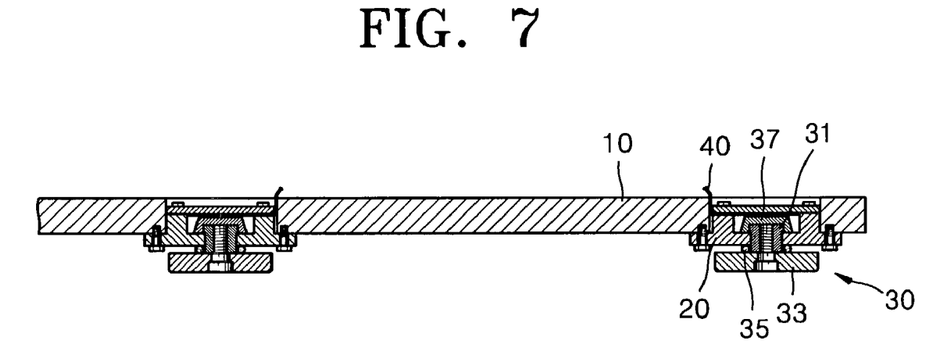
FIG. 7 is a sectional view illustrating a robot foot structure adopting the ground reaction force measuring module for a walking robot according to the first preferred embodiment of the present invention.
Figure 8A:
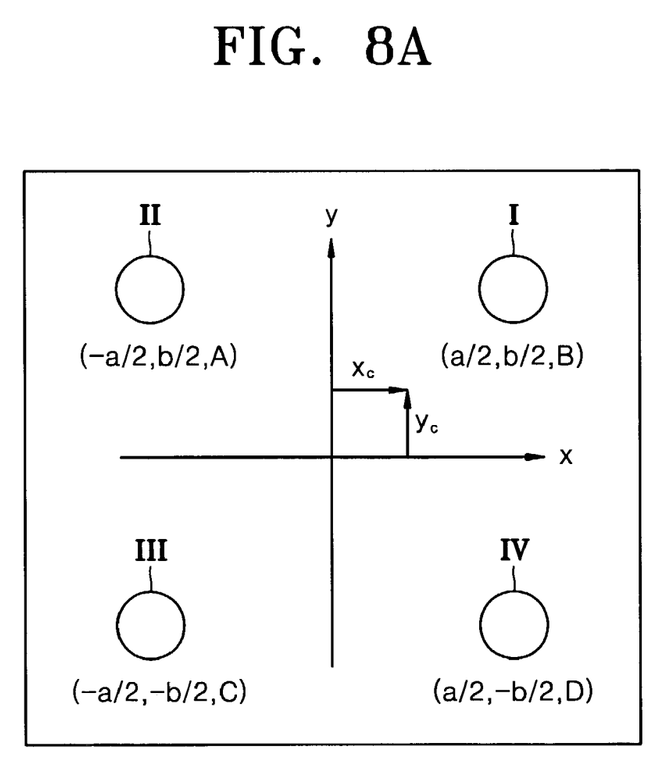
FIG. 8A is a view illustrating the ground reaction measuring modules installed at four positions of the robot foot to explain the calculation of the center of a ground reaction force.
Figure 8B:
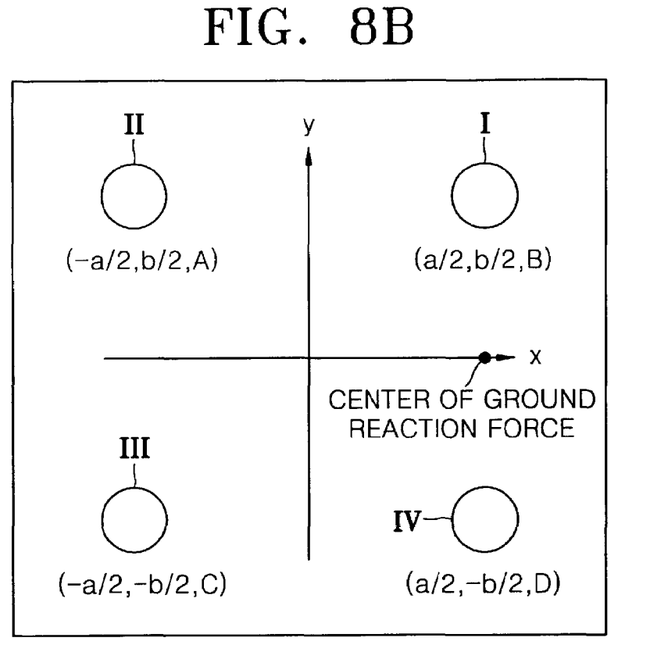
FIGS. 8B through 8C are views for explaining an example of calculation not only the center of a ground reaction force but also the size thereof by arranging the ground reaction measuring modules at four positions on the robot foot.
Figure 8C:
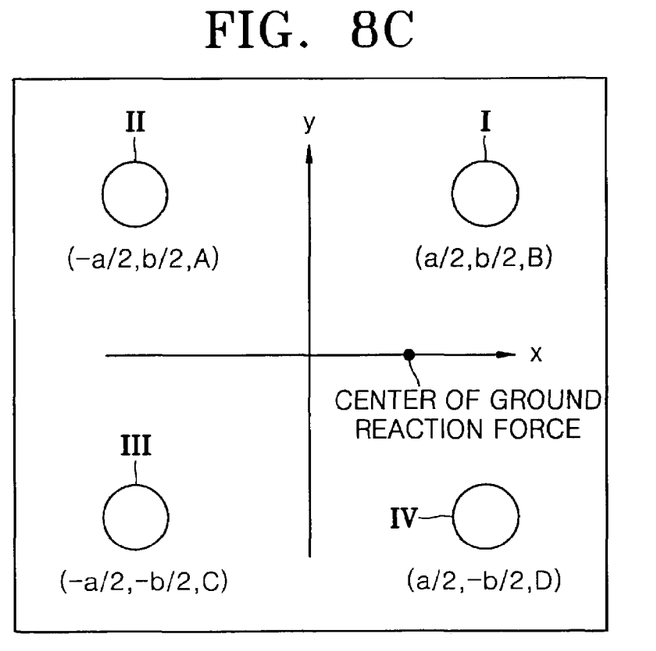
Figure 9:
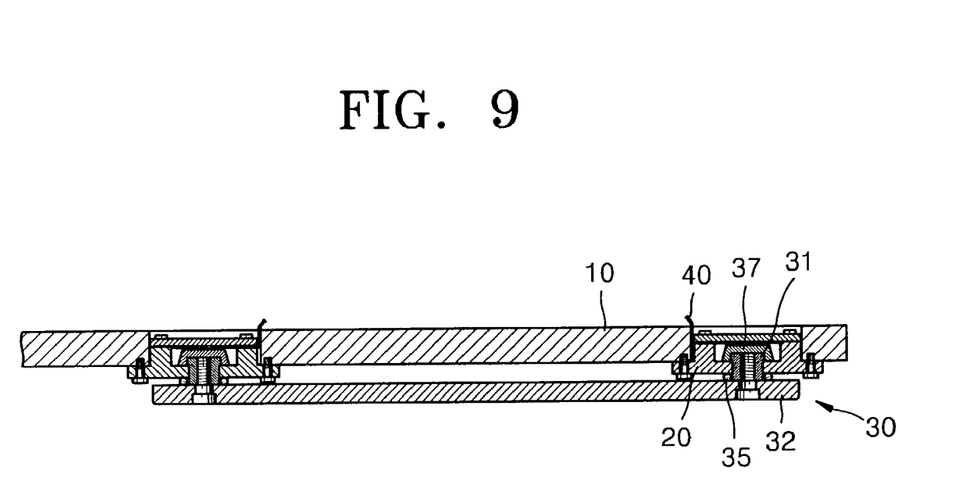
FIG. 9 is a sectional view illustrating a robot foot structure adopting the ground reaction force measuring module for a walking robot according to the second preferred embodiment of the present invention.

Referring to FIGS. 7 through 9, robot foot structures adopting the ground reaction force measuring module according to the above preferred embodiments will now be described.

Referring to FIG. 7, a robot foot structure according to a preferred embodiment of the present invention includes the robot foot 10 and a plurality of the ground reaction force measuring modules installed at predetermined portions of the robot foot 10 facing the ground.

Each of the ground reaction force measuring modules includes the housing 20, the moving unit 30 installed capable of moving with respect to the housing 20 according to the presence of a pressing force to the ground, and a compression sensor 40 installed in the housing 20 to measure a reaction force of the ground from the presence of the pressing force transferred through the moving unit 30. Since the structures and operations of the housing 20, the moving unit 30, and the compression sensor 40 are substantially the same as those described with reference to FIGS. 1 through 6, detailed descriptions thereof will be omitted.

In the present preferred embodiment, a plurality of the support members 33 are installed at the ground reaction force measuring modules as one constituent element of the moving unit 30. Accordingly, the ground reaction force transferred to the robot foot 10 can be independently measured by the portions where the ground reaction force measuring modules are installed. Thus, when the robot walks on an uneven ground, measurement of the ground reaction force is made easy.

FIG. 8A shows a case in which the ground reaction force measuring modules of FIG. 7 are arranged at four positions I, II, III, and IV of the robot foot.

In FIG. 8A, a and b denote position values of each of the X-axis direction and the Y-axis direction of the ground reaction force measuring module disposed at the quadrants I, II, III, and IV, respectively. Each of A, B, C, and D denotes an A/D conversion value, for example, a value between 0 through 1023.

In this case, the centers $x_c$ and $y_c$ of the ground reaction forces in the X-axis direction and the Y-axis direction are obtained as follows. That is, the relationship between the $x_c$ and $y_c$, and a, b, and the A/D conversion value satisfies the following equations.

$$\left(\frac{a}{2} - x_c\right)(B + D) = \left(x_c + \frac{a}{2}\right)(A + C) \quad \text{[Equation 1]}$$

$$\left(\frac{b}{2} - y_c\right)(A + B) = \left(y_c + \frac{b}{2}\right)(C + D) \quad \text{[Equation 2]}$$

Equations 1 and 2 can be rewritten in terms of $x_c$ and $y_c$ as follows.

$$x_c = \frac{a(B + D - A - C)}{2(A + B + C + D)} \quad \text{[Equation 3]}$$

$$y_c = \frac{b(A + B - C - D)}{2(A + B + C + D)} \quad \text{[Equation 4]}$$

As described above, by producing the centers $x_c$ and $y_c$ of the ground reaction forces using the ground reaction force measuring modules, the walking robot can keep balance based on the centers of the ground reaction force.

Since the above equations express only the positions of the centers of the ground reaction force, to indicate the magnitude of the ground reaction forces together, the following equations can be used.

$$x'_c = \frac{a(B + D - A - C)}{2N} \quad \text{[Equation 5]}$$

$$y'_c = \frac{b(A + B - C - D)}{2N}$$

Here, N denotes an A/D conversion value of the overall load applied to the ground reaction force measuring modules.

For example, when a force of 0 kg is applied to both Sections II and III of the robot foot adopting compression sensors capable of measuring a load up to 10 kg (assuming that the A/D conversion value when a load of 10 kg is applied is N) and 1) a total load of 20 kg is divided so that a force of 10 kg is applied to each of Sections I and IV and 2) a total load of 10 kg is divided so that a force of 5 kg is applied to each of Sections I and IV, the center of a ground reaction force obtained from the calculation of Equation 4 is indicated as shown in FIG. 8B, for the two cases 1) and 2). However, according to the calculation of Equation 5, in the case 1), since the center of a ground reaction force is indicated as shown in FIG. 8B and, in the case 2), the center of a ground reaction force is indicated as shown in FIG. 8C, the magnitude of a ground reaction force can be estimated.

Referring to FIG. 9, a robot foot structure according to another preferred embodiment of the present invention includes the robot foot 10 and a plurality of the ground reaction force measuring modules installed at predetermined portions of the robot foot 10 facing the ground.

Each of the ground reaction force measuring modules includes the housing 20, the moving unit 30 installed capable of moving with respect to the housing 20 according to the presence of a ground reaction force to the ground, and a compression sensor 40 installed in the housing 20 to measure the reaction force of the ground from the presence of the pressure transferred through the moving unit 30. Since the structures and operations of the housing 20, the moving unit 30, and the compression sensor 40 are substantially the same as those described with reference to FIGS. 1 through 6, detailed descriptions thereof will be omitted.

In the present preferred embodiment, the ground reaction force measuring modules are characteristically arranged to interact with one another with respect to the ground reaction force measured at the portions where the ground reaction force measuring modules are installed.

For this purpose, the moving unit 30 according to the present preferred embodiment includes a support member 32 integrally formed throughout at least two of the ground reaction force measuring modules, as one constituent element. In this case, when the walking robot walks on an uneven surface, the measurement of a ground reaction force is made easy. That is, since the values independently measured by the ground reaction force measuring module do not affect one another, a stable signal value can be produced.

In the above-described ground reaction force measuring modules, each of the support portion 33 independently provided and the support member 32 integrally formed is detachably coupled to the moving member 31 by the screw (39 of FIG. 1), the support members can be easily replaced, if necessary.

In the above robot foot structure, since the installation position of the ground reaction force measuring module can be easily changed, a change in the center of gravity according to a change in the structure of a walking robot, that is, a change in the upper body of the walking robot, can be easily coped with.

As described above, the ground reaction force measuring module of a walking robot having the above structure, and a robot foot structure adopting the same according to the present invention has merits in that a compact module is possible and a cost can be reduced, compared to the conventional measuring module using a load cell.

Also, since a plurality of sensors measuring the same load and/or sensors measuring different loads are installed as a load measurement sensor, a change in the ground reaction force in a wide range can be stably coped with. Since a cap exhibiting elasticity is provided, the compression sensor can be protected from an impact transferred from the ground.

Furthermore, since parts are modularized, the installation position can be easily changed with respect to the robot foot so that a change in the center of gravity according to a change in the structure of a walking robot can be actively coped with.

What is claimed is:

1. A ground reaction force measuring module for a walking robot comprising:
    a housing installed at a predetermined portion of the walking robot facing the ground;
    a moving unit capable of moving with respect to the housing according to the presence of a pressing force to the ground transferred from the ground to the walking robot; and
    a compression sensor installed in the housing to measure a reaction force of the ground from the presence of the pressing force transferred through the moving unit,
    wherein the housing comprises:
        a compression sensor holder including an accommodation portion in which the compression sensor is accommodated and a through hole connecting the accommodation portion and the outside; and
        a cover member coupled to the housing above the accommodation portion.

2. The module as claimed in claim 1, wherein the moving unit comprises:
    a moving member inserted in the through hole capable of moving therein;
    a cap member inserted around one end of the moving member disposed in the accommodation portion and selectively contacting the compression sensor according to a position of the moving member;
    a support member coupled to the other end of the moving member and directly contacting the ground to support the walking robot; and
    an elastic member interposed between the housing and the support member and preventing the cap member from contacting the compression sensor when the pressing force acting on the support member is removed.

3. The module as claimed in claim 1, wherein the compression sensor is a thin film type load measurement sensor capable of measuring the amount of a change in the pressure transferred through the moving unit.

4. The module as claimed in claim 3, wherein the compression sensor includes at least two film type load or pressure measurement sensors measuring the same load so that a ground reaction force is measured from an average value of the load measured by the respective film type load or pressure measurement sensors.

5. The module as claimed in claim 3, wherein the compression sensor includes at least two film type load or pressure measurement sensors measuring different loads so that a ground reaction force is measured by selecting the film type load or pressure measurement sensors according to a range of a ground reaction force value.

6. A robot foot structure comprising:
    a robot foot; and
    a plurality of ground reaction force measuring modules installed at predetermined portions of the robot foot facing the ground, the ground reaction force measuring modules including a housing installed at a predetermined portion of a walking robot facing the ground, a moving unit capable of moving with respect to the housing according to the presence of a pressing force to the ground transferred to the walking robot, and a compression sensor installed in the housing to measure a reaction force of the ground from the presence of the pressing force transferred through the moving unit,
    wherein the ground reaction force measuring modules are arranged to independently measure a ground reaction force with respect to the portion where each of the ground reaction force measuring modules is installed, and
    wherein the housing comprises a compression sensor holder including an accommodation portion in which the compression sensor is accommodated and a through hole connecting the accommodation portion and the outside and a cover member coupled to the housing above the accommodation portion.

7. The structure as claimed in claim 6, wherein
the moving unit comprises a moving member inserted in the through hole capable of moving therein, a cap member inserted around one end of the moving member disposed in the accommodation portion and selectively contacting the compression sensor according to a position of the moving member, a support member coupled to the other end of the moving member and directly contacting the ground to support the walking robot, and an elastic member interposed between the housing and the support member and preventing the cap member from contacting the compression sensor when the pressing force acting on the support member is removed.

8. A robot foot structure comprising:
    a robot foot; and
    a plurality of ground reaction force measuring modules installed at predetermined portions of the robot foot facing the ground, the ground reaction force measuring modules including a housing installed at a predetermined portion of a walking robot facing the ground, a moving unit capable of moving with respect to the housing according to the presence of a pressing force to the ground transferred to the walking robot, and a compression sensor installed in the housing to measure a reaction force of the ground from the presence of the pressing force transferred through the moving unit,
    wherein the ground reaction force measuring modules are arranged to interact with one another with respect to ground reaction forces measured by the respective portions where the ground reaction force measuring modules are installed, and
    wherein the housing comprises a compression sensor holder including an accommodation portion in which the compression sensor is accommodated and a through hole connecting the accommodation portion and the outside and a cover member coupled to the housing above the accommodation portion.

9. The structure as claimed in claim 8, wherein
the moving unit comprises a moving member inserted in the through hole capable of moving therein, a cap member inserted around one end of the moving member disposed in the accommodation portion and selectively contacting the compression sensor according to a position of the moving member, a support member coupled to the other end of the moving member and directly contacting the ground to support the walking robot, and an elastic member interposed between the housing and the support member and preventing the cap member from contacting the compression sensor when the pressing force acting on the support member is removed, and
wherein the support member is integrally coupled to at least two of the ground reaction force measuring modules.

* * * * *